(12) United States Patent
Wengerter et al.

(10) Patent No.: US 8,005,163 B2
(45) Date of Patent: *Aug. 23, 2011

(54) CONSTELLATION REARRANGEMENT FOR TRANSMIT DIVERSITY SCHEMES

(75) Inventors: Christian Wengerter, Kleinheubach (DE); Alexander Golitschek Edler Von Elbwart, Darmstadt (DE); Eiko Seidel, Darmstadt (DE)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/484,060

(22) Filed: Jun. 12, 2009

(65) Prior Publication Data

US 2009/0245407 A1    Oct. 1, 2009

Related U.S. Application Data

(63) Continuation of application No. 11/634,127, filed on Dec. 6, 2006, now Pat. No. 7,558,331, which is a continuation of application No. 10/501,905, filed as application No. PCT/EP02/011695 on Oct. 18, 2002, now Pat. No. 7,164,727.

(51) Int. Cl.
*H04L 27/00* (2006.01)
*H04L 27/36* (2006.01)
*H04L 23/00* (2006.01)
*H03C 7/02* (2006.01)

(52) U.S. Cl. ......... 375/298; 375/299; 375/377; 455/101

(58) Field of Classification Search .................. 375/267, 375/295, 298, 299, 308, 261, 267.261, 279–281; 370/349, 465; 714/701, 748, 786; 455/91, 455/101; 332/103

See application file for complete search history.

(56) References Cited

U.S. PATENT DOCUMENTS

| | | | | |
|---|---|---|---|---|
| 5,583,889 | A | * | 12/1996 | Citta et al. .................... 375/341 |
| 5,914,959 | A | * | 6/1999 | Marchetto et al. ............ 370/468 |
| 6,134,273 | A | * | 10/2000 | Wu et al. ....................... 375/261 |
| 6,208,663 | B1 | * | 3/2001 | Schramm et al. ............. 370/465 |
| 6,247,150 | B1 | * | 6/2001 | Niemela ....................... 714/701 |
| 6,476,734 | B2 | | 11/2002 | Jeong et al. |
| 6,536,010 | B1 | * | 3/2003 | Brink ............................ 714/794 |

(Continued)

FOREIGN PATENT DOCUMENTS

| | | |
|---|---|---|
| EP | 0735701 | 10/1996 |
| EP | 1096718 A2 | 5/2001 |
| WO | 02067491 | 8/2002 |

OTHER PUBLICATIONS

International Search Report dated Jun. 26, 2003.

(Continued)

*Primary Examiner* — Tesfaldet Bocure

(74) *Attorney, Agent, or Firm* — Dickinson Wright PLLC

(57) ABSTRACT

A method of transmitting data in a wireless communication system from a transmitter to a receiver, comprising the steps of modulating data at the transmitter using a first signal constellation pattern to obtain a first data symbol. The first data symbol is transmitted to the receiver using a first diversity branch. Further, the data is modulated at the transmitter using a second signal constellation pattern to obtain a second data symbol. Then, the second data symbol is transmitted to the receiver over a second diversity path. Finally, the received first and second data symbol are diversity combined at the receiver.

Figure 1:
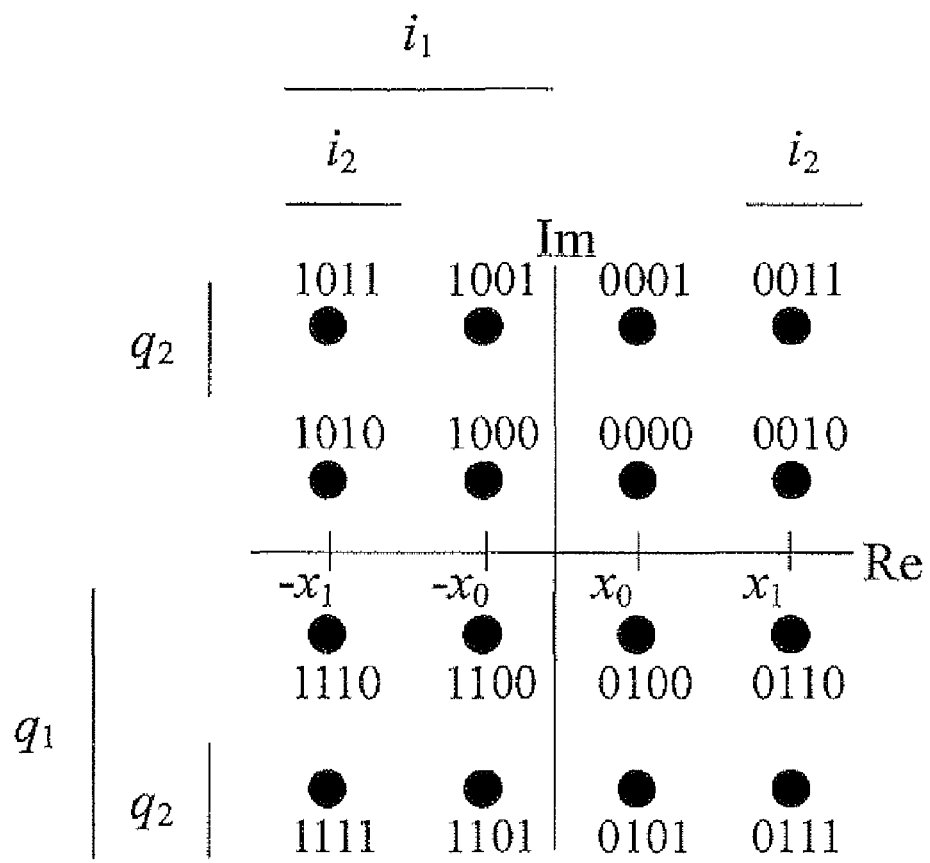

The invention further relates to a transmitter and a receiver embodied to carry out the method of the invention.

16 Claims, 5 Drawing Sheets

U.S. PATENT DOCUMENTS

| | | |
|---|---|---|
| 6,580,705 B1 | 6/2003 | Riazi et al. |
| 6,738,370 B2 * | 5/2004 | Ostman .................... 370/349 |
| 6,769,085 B2 | 7/2004 | Von Elbwart et al. |
| 6,892,341 B2 | 5/2005 | Golitschek et al. |
| 7,131,049 B2 * | 10/2006 | Kim et al. .................. 714/751 |
| 7,164,727 B2 | 1/2007 | Wengerter et al. |
| 7,173,978 B2 * | 2/2007 | Zhang et al. ............... 375/298 |
| 7,558,331 B2 * | 7/2009 | Wengerter et al. .......... 375/267 |
| 7,573,852 B2 * | 8/2009 | Kim et al. .................. 370/335 |
| 2002/0025005 A1 * | 2/2002 | Onggosanusi et al. ....... 375/295 |
| 2002/0036980 A1 | 3/2002 | Lundby et al. |
| 2003/0048857 A1 | 3/2003 | Onggosanusi et al. |
| 2003/0110436 A1 | 6/2003 | Golitschek Edler Von Elbwart et al. |
| 2003/0235147 A1 | 12/2003 | Walton et al. |
| 2008/0260068 A1 * | 10/2008 | Seyedi-Esfahani ......... 375/298 |

OTHER PUBLICATIONS

A. Chindapol, et al.; "Bit-Interleaved Coded Modulation with Signal Space Diversity in Rayleigh Fading," Signals, Systems, and Computers, 1999, Conference Record of the Thirty-Third Asilomar Conference on Oct. 24-27, 1999, pp. 1003-1007, XP010373787, ISBN: 0-7803-5700-0.

E. Ozturk, et al.; "A Combined Interleaving Technique for Trellis Coded MPSK Systems in Rayleigh Fading Channels," Wireless Personal Communications, Kluwer Academic Publishers, NL, vol. 16, No. 3, Mar. 1, 2001, pp. 245-257, XP001001794, ISSN: 0929-6212.

Ch. Wengerter, et al.; "Advanced Hybrid ARQ Technique Employing a Signal Constellation Rearrangement," 2002 IEEE, pp. 1-5.

European Office Action dated Nov. 25, 2005.

* cited by examiner

Mapping 1 (bit-mapping order: $i_1q_1i_2q_2$)

Mapping 2 (bit-mapping order: $i_1q_1i_2q_2$)

FIG. 3B  Mapping 4 (bit-mapping order: $i_1q_1i_2q_2$)

FIG. 3A  Mapping 3 (bit-mapping order: $i_1q_1i_2q_2$)

CONSTELLATION REARRANGEMENT FOR TRANSMIT DIVERSITY SCHEMES

REFERENCE TO RELATED APPLICATION

This is a continuation application of application Ser. No. 11/634,127 filed Dec. 6, 2006 now issued as U.S. Pat. No. 7,558,331 on Jul. 7, 2009, which is a continuation of application Ser. No. 10/501,905 filed Oct. 20, 2004, which issued as U.S. Pat. No. 7,164,727 on Jan. 16, 2007, which is a national phase application of PCT international application number PCT/EP2002/011695 filed on Oct. 18, 2002, the entire contents of each of which are incorporated by reference herein.

BACKGRAOUND OF THE INVENTION

The present invention relates generally to transmission techniques in wireless communication systems and in particular to a method, transceiver and receiver using transmit diversity schemes wherein the bit-to-symbol mapping is performed differently for different transmitted diversity branches. The invention is particularly applicable to systems with unreliable and time-varying channel conditions resulting in an improved performance avoiding transmission errors.

There exist several well known transmit diversity techniques wherein one or several redundancy versions relating to identical data are transmitted on several (at least two) diversity branches "by default" without explicitly requesting (by a feedback channel) further diversity branches (as done in an ARQ scheme by requesting retransmissions). For example the following schemes are considered as transmit diversity:

Site Diversity: The transmitted signal originates from different sites, e.g. different base stations in a cellular environment.

Antenna Diversity: The transmitted signal originates from different antennas, e.g. different antennas of a multi-antenna base station.

Polarization Diversity: The transmitted signal is mapped onto different polarizations.

Frequency Diversity: The transmitted signal is mapped e.g. on different carrier frequencies or on different frequency hopping sequences.

Time Diversity: The transmitted signal is e.g. mapped on different interleaving sequences.

Multicode Diversity: The transmitted signal is mapped on different codes in e.g. a CDMA (Code Division Multiple Access) system.

There are known several diversity combining techniques. The following three techniques are the most common ones:

Selection Combining: Selecting the diversity branch with the highest SNR for decoding, ignoring the remaining ones.

Equal Gain Combining: Combining received diversity branches with ignoring the differences in received SNR.

Maximal Ratio Combining: Combining received diversity branches taking the received SNR of each diversity branch into account. The combining can be performed at bit-level (e.g. LLR) or at modulation symbol level.

Furthermore, a common technique for error detection/correction is based on Automatic Repeat reQuest (ARQ) schemes together with Forward Error Correction (FEC), called hybrid ARQ (HARQ). If an error is detected within a packet by the Cyclic Redundancy Check (CRC), the receiver requests the transmitter to send additional information (re-transmission) to improve the probability to correctly decode the erroneous packet.

In WO-02/067491 A1 a method for hybrid ARQ transmissions has been disclosed which averages the bit reliabilities over successively requested retransmissions by means of signal constellation rearrangement.

As shown therein, when employing higher order modulation formats (e.g. M-PSK, M-QAM with $\log_2(M)>2$), where more than 2 bits are mapped onto one modulation symbol, the bits mapped onto a modulation symbol have different reliabilities depending on their content and depending on the chosen mapping. This leads for most FEC (e.g. Turbo Codes) schemes to a degraded decoder performance compared to an input of more equally distributed bit reliabilities.

In conventional communication systems the modulation dependent variations in bit reliabilities are not taken into account and, hence, usually the variations remain after combining the diversity branches at the receiver.

The object of the invention is to provide a method, transmitter and receiver which show an improved performance with regard to transmission errors. This object is solved by a method, transmitter and receiver as set forth in the independent claims.

The invention is based on the idea to improve the decoding performance at the receiver by applying different signal constellation mappings to the available distinguishable transmit diversity branches. The idea is applicable to modulation formats, where more than 2 bits are mapped onto one modulation symbol, since this implies a variation in reliabilities for the bits mapped onto the signal constellation (e.g. for regular BPSK and QPSK modulation all bits mapped onto a modulation symbol have the same reliability). The variations depend on the employed mapping and on the actually transmitted content of the bits.

Depending on the employed modulation format and the actual number of bits mapped onto a single modulation symbol, for a given arbitrary number ($N>1$) of available diversity branches the quality of the averaging process is different. Averaging in the sense of the present invention is understood as a process of reducing the differences in mean combined bit reliabilities among the different bits of a data symbol. Although it might be that only after using several diversity branches or paths a perfect averaging with no remaining differences is achieved, averaging means in the context of the document any process steps in the direction of reducing the mean combined bit reliability differences. Assuming on average an equal SNR for all available diversity branches, for 16-QAM 4 mappings (4 diversity branches) would be needed to perfectly average out the reliabilities for all bits mapped on any symbol. However, if e.g. only 2 branches are available a perfect averaging is not possible. Hence, the averaging should then be performed on a best effort basis as shown in the example below.

The present invention will be more readily understood from the following detailed description of preferred embodiments with reference to the accompanying figures which show:

BRIEF DESCRIPTION OF THE INVENTION

Figure 2:
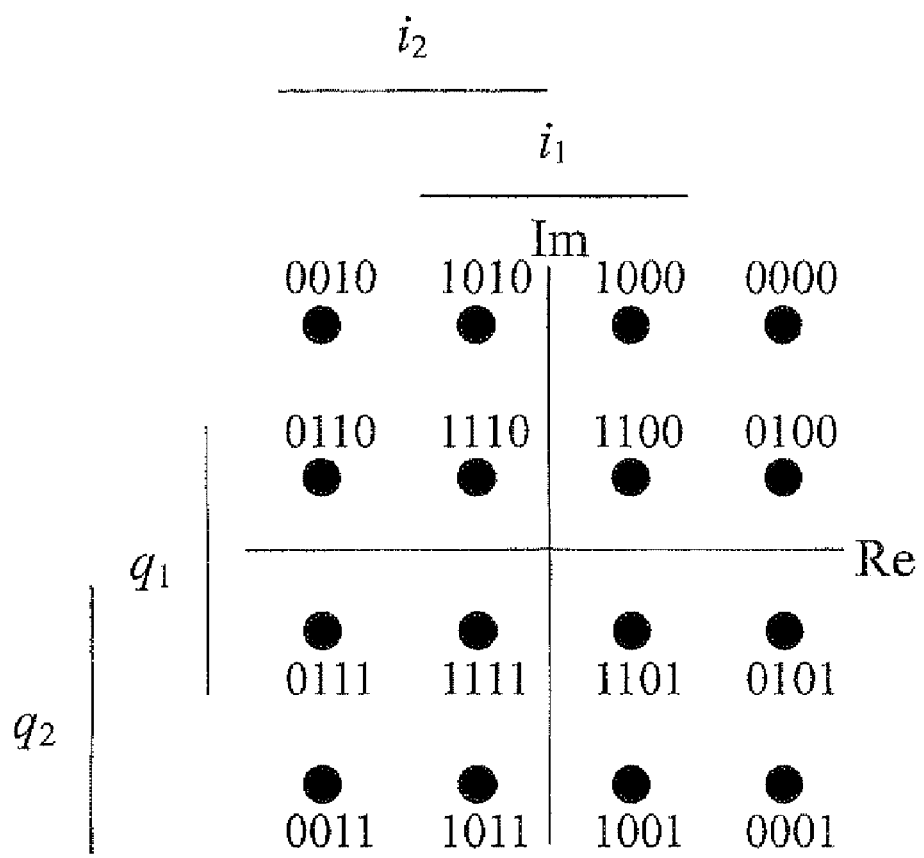
Figure 4:
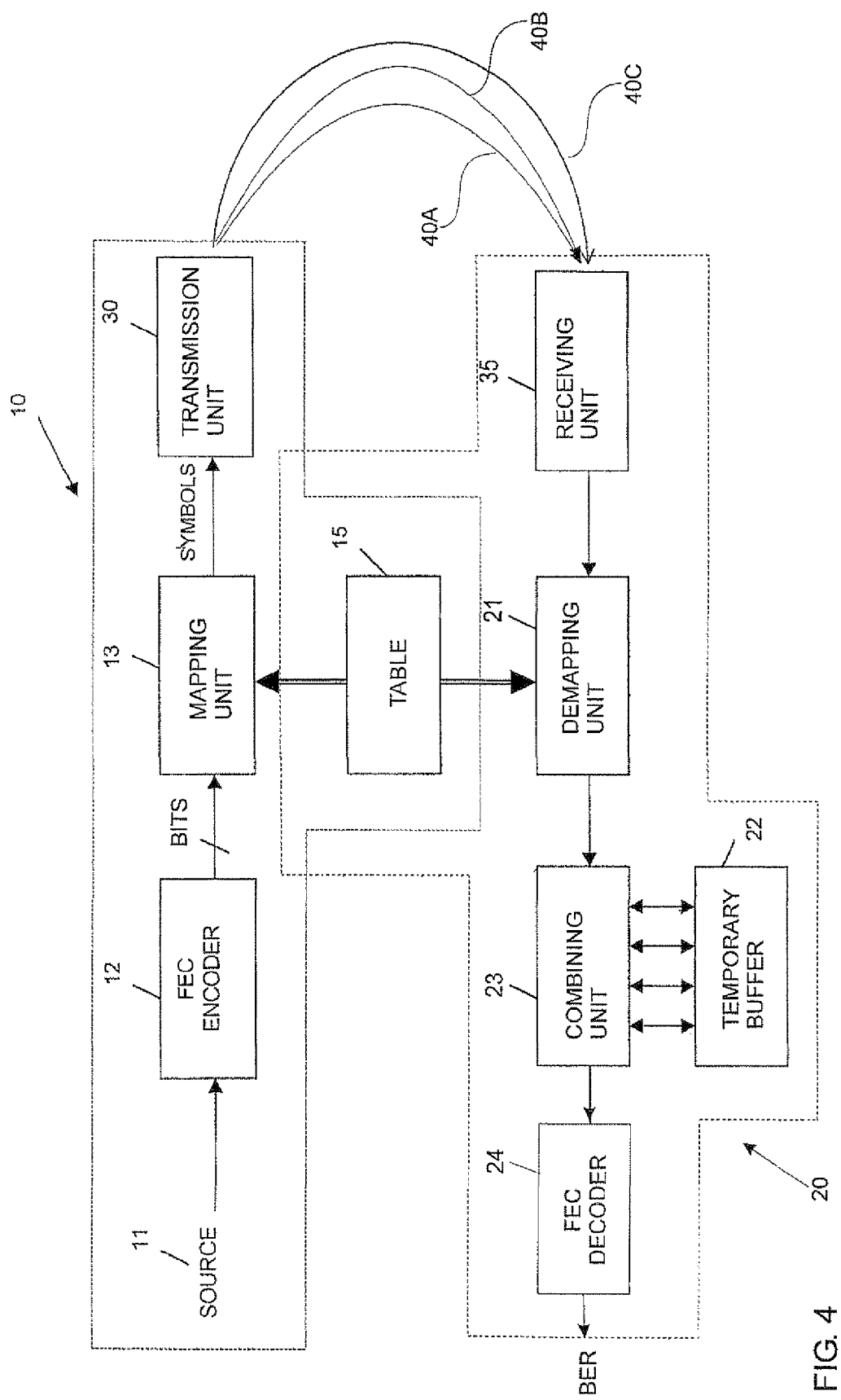
Figure 5:
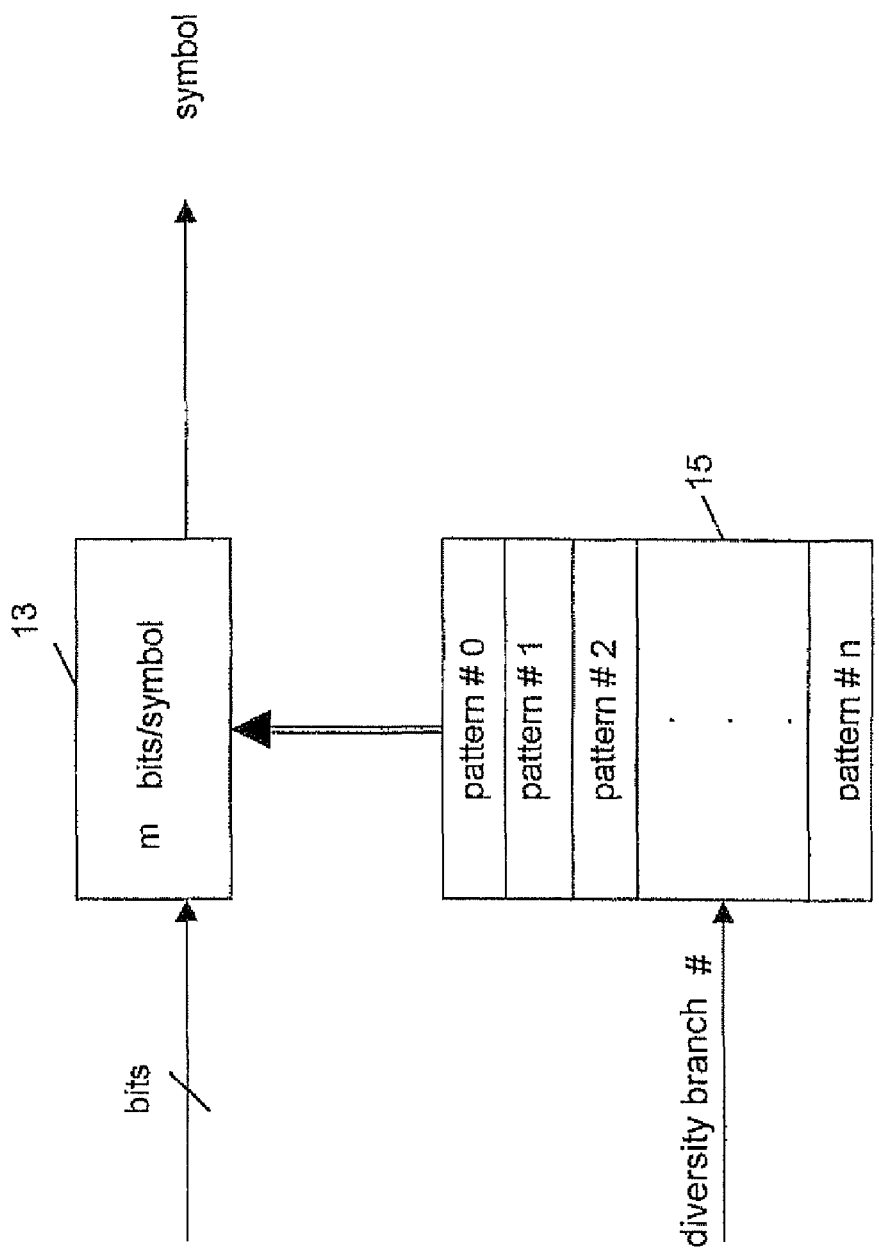

FIG. 1 an example for a 16-QAM signal constellation;

FIG. 2 an example for a different mapping of a 16-QAM signal constellation;

FIGS. 3A and 3B two further examples of 16-QAM signal constellations;

FIG. 4 an exemplary embodiment of a communication system according to the present invention; and FIG. 5 details of a table for storing a plurality of signal constellation patterns.

DETAIL DESCRIPTION OF THE INVENTION

The following detailed description is shown for a square 16-QAM with Gray mapping. However, without loss of generality the shown example is extendable to other M-QAM and M-PSK (with $\log_2(M)>2$) formats. Moreover, the examples are shown for transmit diversity schemes transmitting an identical bit-sequence on both branches (single redundancy version scheme). Then again, an extension to a transmit diversity scheme transmitting only partly identical bits on the diversity branches can be accomplished. An example for a system using multiple redundancy versions is described in copending EP 01127244, filed on Nov. 16, 2001. Assuming a turbo encoder, the systematic bits can be averaged on a higher level as compared to the parity bits.

Assuming a transmit diversity scheme with two generated diversity branches, which are distinguishable at the receiver (e.g. by different spreading or scrambling codes in a CDMA system, or other techniques of creating orthogonal branches) and a transmission of the same redundancy version, usually the received diversity branches are combined at the receiver before applying the FEC decoder. A common combining technique is the maximal ratio combining, which can be achieved by adding the calculated log-likelihood-ratios LLRs from each individual received diversity branch.

The log-likelihood-ratio LLR as a soft-metric for the reliability of a demodulated bit b from a received modulation symbol $r=x+jy$ is defined as follows:

$$LLR(b) = \ln\left[\frac{Pr\{b=1|r\}}{Pr\{b=0|r\}}\right] \quad (1)$$

As can be seen from FIG. 1 (bars indicate rows/columns for which the respective bit equals 1), the mappings of the in-phase component bits and the quadrature component bits on the signal constellation are orthogonal (for M-PSK the LLR calculation cannot be simplified by separating into complex components, however the general procedure of bit-reliability averaging is similar). Therefore, it is sufficient to focus on the in-phase component bits $i_1$ and $i_2$. The same conclusions apply then for $q_1$ and $q_2$.

Assuming that Mapping 1 from FIG. 1 is applied for the bit-to-symbol mapping for the 1$^{st}$ diversity branch, the log-likelihood-ratio LLR of the most significant bit (MSB) $i_1$ and the least significant bit (LSB) $i_2$ yields the following equations for a Gaussian channel:

$$LLR(i_1) = \ln\left[\frac{e^{-K(x+x_0)^2} + e^{-K(x+x_1)^2}}{e^{-K(x-x_0)^2} + e^{-K(x-x_1)^2}}\right] \quad (2)$$

$$LLR(i_2) = \ln\left[\frac{e^{-K(x-x_1)^2} + e^{-K(x+x_1)^2}}{e^{-K(x-x_0)^2} + e^{-K(x+x_0)^2}}\right] \quad (3)$$

where x denotes the in-phase component of the normalized received modulation symbol r and K is a factor proportional to the signal-to-noise ratio. Under the assumption of a uniform signal constellation ($x_1=3 x_0$, regular 16-QAM) equations (2) and (3) can be fairly good approximated as shown in S. Le Goff, A. Glavieux, C. Berrou, "Turbo-Codes and High Spectral Efficiency Modulation," IEEE SUPERCOMM/ICC '94, Vol. 2, pp. 645-649, 1994, and Ch. Wengerter, A. Golitschek Edler von Elbwart, E. Seidel, G. Velev, M. P. Schmitt, "Advanced Hybrid ARQ Technique Employing a Signal Constellation Rearrangement," IEEE Proceedings of VTC 2002 Fall, Vancouver, Canada, September 2002 by $$LLR(i_1) \approx -4Kx_0 x \quad (4)$$

$$LLR(i_2) \approx -4Kx_0(2x_0-|x|) \quad (5)$$

The mean LLR for $i_1$ and $i_2$ for a given transmitted modulation symbol yields the values given in Table 1 (substituting $4Kx_0^2$ by $\Lambda$). Mean in this sense, refers to that the mean received value for a given transmitted constellation point, exactly matches this transmitted constellation point. Individual samples of course experience noise according to the parameter K. However, for a Gaussian channel the mean value of the noise process is zero. In case of transmitted modulation symbols $0q_1 1q_2$ and $1q_1 1q_2$, where $q_1$ and $q_2$ are arbitrary, the magnitude of the mean $LLR(i_1)$ is higher than of the mean LLR ($i_2$). This means that the LLR for the MSB $i_1$ depends on the content of the LSB $i_2$; e.g. in FIG. 1 $i_1$ has a higher mean reliability in case the logical value for $i_2$ equals 1 (leftmost and rightmost columns). Hence, assuming a uniform distribution of transmitted modulation symbols, on average 50% of the MSBs $i_1$ have about three times the magnitude in LLR of $i_2$.

TABLE 1

Mean LLRs for bits mapped on the in-phase component of the signal constellation for Mapping 1 in FIG. 1 according to equations (4) and (5).

| Symbol $(i_1 q_1 i_2 q_2)$ | Mean value of x | Mean LLR ($i_1$) | Mean LLR ($i_2$) |
|---|---|---|---|
| $0q_1 0q_2$ | $x_0$ | $-4Kx_0^2 = -\Lambda$ | $-4Kx_0^2 = -\Lambda$ |
| $0q_1 1q_2$ | $x_1$ | $-12Kx_0^2 = -3\Lambda$ | $4Kx_0^2 = \Lambda$ |
| $1q_1 0q_2$ | $-x_0$ | $4Kx_0^2 = \Lambda$ | $-4Kx_0^2 = -\Lambda$ |
| $1q_1 1q_2$ | $-x_1$ | $12Kx_0^2 = 3\Lambda$ | $4Kx_0^2 = \Lambda$ |

Figure 3:
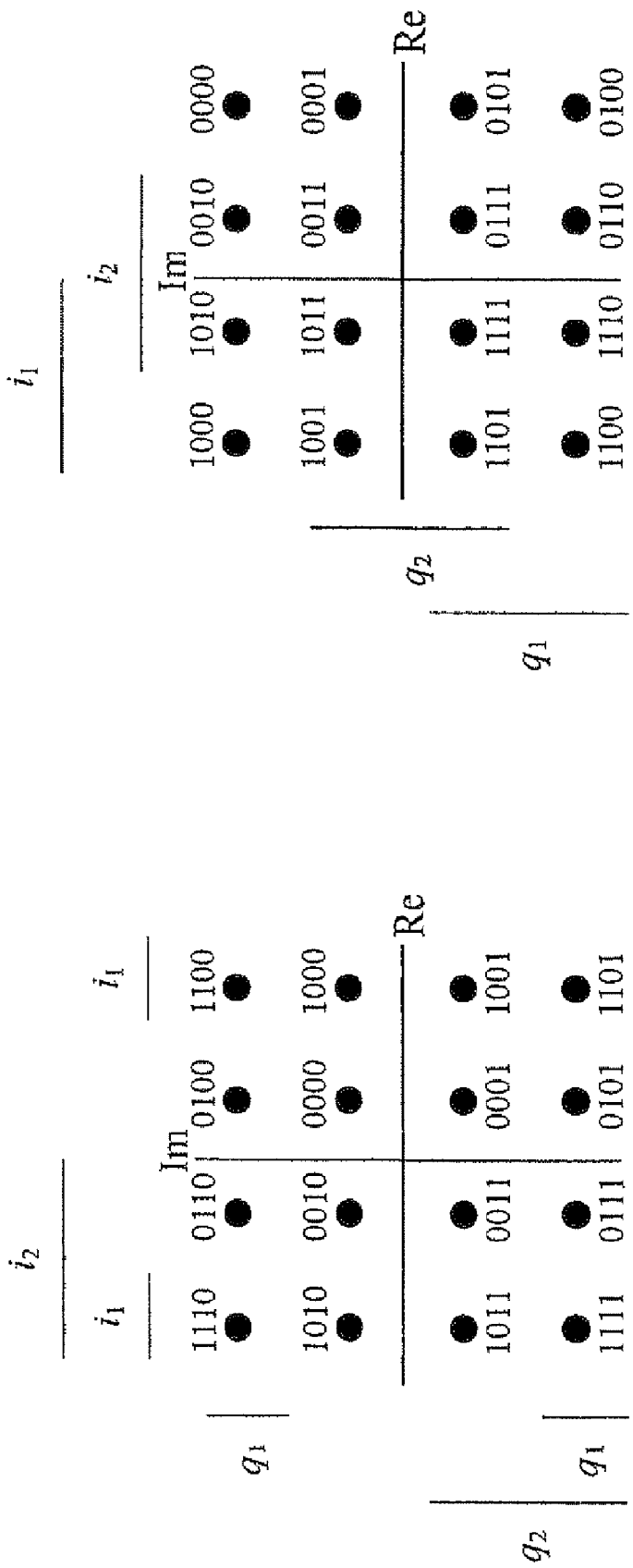

If now adding a 2$^{nd}$ transmit diversity branch transmitting e.g. an identical bit sequence prior art schemes would employ an identical mapping to the 1$^{st}$ diversity branch. Here, it is proposed to employ a 2$^{nd}$ signal constellation mapping (Mapping 2) according to FIG. 2 (of course, also one of the constellations depicted in FIG. 3 are possible), which yields the mean LLRs given in Table 2.

TABLE 2

Mean LLRs for bits mapped on the in-phase component of the signal constellation for Mapping 2 in FIG. 2.

| Symbol $(i_1 q_1 i_2 q_2)$ | Mean value of x | Mean LLR ($i_1$) | Mean LLR ($i_2$) |
|---|---|---|---|
| $0q_1 0q_2$ | $x_0$ | $-\Lambda$ | $-3\Lambda$ |
| $0q_1 1q_2$ | $x_1$ | $-\Lambda$ | $3\Lambda$ |
| $1q_1 0q_2$ | $-x_0$ | $\Lambda$ | $-\Lambda$ |
| $1q_1 1q_2$ | $-x_1$ | $\Lambda$ | $\Lambda$ |

Comparing now the soft-combined LLRs of the received diversity branches applying the constellation rearrangement (Mapping 1+2) and applying the identical mappings (Mapping 1+1, prior art), it can be observed from table 3 that the combined mean LLR values with applying the constellation rearrangement have a more uniform distribution (Magnitudes: $4\times4 \Lambda$ and $4\times2 \Lambda$ instead of $2\times6 \Lambda$ and $6\times2 \Lambda$). For most FEC decoders (e.g. Turbo Codes and Convolutional Codes) this leads to a better decoding performance. Investigations have revealed that in particular Turbo encoding/decoding systems exhibit a superior performance. It should be noted, that the chosen mappings are non exhaustive and more combinations of mappings fulfilling the same requirements can be found.

TABLE 3

Mean LLRs (per branch) and combined mean LLRs for bits mapped on the in-phase component of the signal constellation for the diversity branches when employing Mapping 1 and 2 and when employing 2 times Mapping 1.

| Transmit | | Constellation Rearrangement (Mapping 1 + 2) | | Prior Art No Rearrangement (Mapping 1 + 1) | |
|---|---|---|---|---|---|
| Diversity Branch | Symbol $(i_1 q_1 i_2 q_2)$ | Mean LLR $(i_1)$ | Mean LLR $(i_2)$ | Mean LLR $(i_1)$ | Mean LLR $(i_2)$ |
| 1 | $0q_1 0q_2$ | $-\Lambda$ | $-\Lambda$ | $-\Lambda$ | $-\Lambda$ |
|  | $0q_1 1q_2$ | $-3\Lambda$ | $\Lambda$ | $-3\Lambda$ | $\Lambda$ |
|  | $1q_1 0q_2$ | $\Lambda$ | $-\Lambda$ | $\Lambda$ | $-\Lambda$ |
|  | $1q_1 1q_2$ | $3\Lambda$ | $\Lambda$ | $3\Lambda$ | $\Lambda$ |
| 2 | $0q_1 0q_2$ | $-\Lambda$ | $-3\Lambda$ | $-\Lambda$ | $-\Lambda$ |
|  | $0q_1 1q_2$ | $-\Lambda$ | $3\Lambda$ | $-3\Lambda$ | $\Lambda$ |
|  | $1q_1 0q_2$ | $\Lambda$ | $-\Lambda$ | $\Lambda$ | $-\Lambda$ |
|  | $1q_1 1q_2$ | $\Lambda$ | $\Lambda$ | $3\Lambda$ | $\Lambda$ |
| Combined 1 + 2 | $0q_1 0q_2$ | $-2\Lambda$ | $-4\Lambda$ | $-2\Lambda$ | $-2\Lambda$ |
|  | $0q_1 1q_2$ | $-4\Lambda$ | $-4\Lambda$ | $-6\Lambda$ | $2\Lambda$ |
|  | $1q_1 0q_2$ | $2\Lambda$ | $-2\Lambda$ | $2\Lambda$ | $-2\Lambda$ |
|  | $1q_1 1q_2$ | $4\Lambda$ | $2\Lambda$ | $6\Lambda$ | $2\Lambda$ |

In the following an example with 4 diversity branches will be described. Here, the same principles apply as for 2 diversity branches. However, since 4 diversity branches are available and the averaging with 2 diversity branches is not perfect, additional mappings can be used to improve the averaging process.

FIGS. 3A and 3B shows the additional mappings for diversity branches 3 and 4, under the assumption that Mappings 1 and 2 are used for branches 1 and 2 (in FIG. 1 and FIG. 2). Then the averaging can be performed perfectly and all bits mapped on any symbol will have an equal mean bit reliability (assuming the same SNR for all transmissions). Table 4 compares the LLRs with and without applying the proposed Constellation Rearrangement. Having a closer look at the combined LLRs, it can be seen that with application of the Constellation Rearrangement the magnitude for all bit reliabilities results in 6 $\Lambda$.

It should be noted again, that the chosen mappings are non exhaustive and more combinations of mappings fulfilling the same requirements can be found.

TABLE 4

Mean LLRs (per branch) and combined mean LLRs for bits mapped on the in-phase component of the signal constellation for the diversity branches when employing Mappings 1 to 4 and when employing 4 times Mapping 1.

| Transmit | | Constellation Rearrangement (Mapping 1 + 2 + 3 + 4) | | Prior Art No Rearrangement (Mapping 1 + 1 + 1) | |
|---|---|---|---|---|---|
| Diversity Branch | Symbol $(i_1 q_1 i_2 q_2)$ | Mean LLR $(i_1)$ | Mean LLR $(i_2)$ | Mean LLR $(i_1)$ | Mean LLR $(i_2)$ |
| 1 | $0q_1 0q_2$ | $-\Lambda$ | $-\Lambda$ | $-\Lambda$ | $-\Lambda$ |
|  | $0q_1 1q_2$ | $-3\Lambda$ | $\Lambda$ | $-3\Lambda$ | $\Lambda$ |
|  | $1q_1 0q_2$ | $\Lambda$ | $-\Lambda$ | $\Lambda$ | $-\Lambda$ |
|  | $1q_1 1q_2$ | $3\Lambda$ | $\Lambda$ | $3\Lambda$ | $\Lambda$ |
| 2 | $0q_1 0q_2$ | $-\Lambda$ | $-3\Lambda$ | $-\Lambda$ | $-\Lambda$ |
|  | $0q_1 1q_2$ | $-\Lambda$ | $3\Lambda$ | $-3\Lambda$ | $\Lambda$ |
|  | $1q_1 0q_2$ | $\Lambda$ | $-\Lambda$ | $\Lambda$ | $-\Lambda$ |
|  | $1q_1 1q_2$ | $\Lambda$ | $\Lambda$ | $3\Lambda$ | $\Lambda$ |

TABLE 4-continued

Mean LLRs (per branch) and combined mean LLRs for bits mapped on the in-phase component of the signal constellation for the diversity branches when employing Mappings 1 to 4 and when employing 4 times Mapping 1.

| Transmit | | Constellation Rearrangement (Mapping 1 + 2 + 3 + 4) | | Prior Art No Rearrangement (Mapping 1 + 1 + 1) | |
|---|---|---|---|---|---|
| Diversity Branch | Symbol $(i_1 q_1 i_2 q_2)$ | Mean LLR $(i_1)$ | Mean LLR $(i_2)$ | Mean LLR $(i_1)$ | Mean LLR $(i_2)$ |
| 3 | $0q_1 0q_2$ | $-\Lambda$ | $-\Lambda$ | $-\Lambda$ | $-\Lambda$ |
|  | $0q_1 1q_2$ | $-\Lambda$ | $\Lambda$ | $-3\Lambda$ | $\Lambda$ |
|  | $1q_1 0q_2$ | $\Lambda$ | $-3\Lambda$ | $\Lambda$ | $-\Lambda$ |
|  | $1q_1 1q_2$ | $\Lambda$ | $3\Lambda$ | $3\Lambda$ | $\Lambda$ |
| 4 | $0q_1 0q_2$ | $-3\Lambda$ | $-\Lambda$ | $-\Lambda$ | $-\Lambda$ |
|  | $0q_1 1q_2$ | $-\Lambda$ | $\Lambda$ | $-3\Lambda$ | $\Lambda$ |
|  | $1q_1 0q_2$ | $3\Lambda$ | $-\Lambda$ | $\Lambda$ | $-\Lambda$ |
|  | $1q_1 1q_2$ | $\Lambda$ | $\Lambda$ | $3\Lambda$ | $\Lambda$ |
| Combined 1 + 2 + 3 + 4 | $0q_1 0q_2$ | $-6\Lambda$ | $-6\Lambda$ | $-4\Lambda$ | $-4\Lambda$ |
|  | $0q_1 1q_2$ | $-6\Lambda$ | $6\Lambda$ | $-12\Lambda$ | $4\Lambda$ |
|  | $1q_1 0q_2$ | $6\Lambda$ | $-6\Lambda$ | $4\Lambda$ | $-4\Lambda$ |
|  | $1q_1 1q_2$ | $6\Lambda$ | $6\Lambda$ | $12\Lambda$ | $4\Lambda$ |

If the constellation rearrangement is performed by applying different mapping schemes, one would end up in employing a number of different mappings as given in FIG. 1, FIG. 2 and FIGS. 3A and 3B. If the identical mapper (e.g. FIG. 1) should be kept for all transmit diversity branches, e.g. mapping 2 can be obtained from mapping 1 by the following operations.

exchange positions of original bits $i_1$ and $i_2$
exchange positions of original bits $q_1$ and $q_2$
logical bit inversion of original bits $i_1$ and $q_1$ Alternatively, those bits that end in positions 1 and 2 can also be inverted (resulting in a different mapping with an identical bit-reliability characteristics).

Therefore, the following table provides an example how to obtain mappings 1 to 4 (or mappings with equivalent bit reliabilities for $i_1$, $i_2$, $q_1$ and $q_2$), where the bits always refer to the first transmission, and a long dash above a character denotes logical bit inversion of that bit:

TABLE 5

Alternative implementation of the Constellation Rearrangement by interleaving (intra-symbol interleaving) and logical inversion of bits mapped onto the modulation symbols.

| Mapping No. | Interleaver and Inverter functionality |
|---|---|
| 1 | $i_1 q_1 i_2 q_2$ |
| 2 | $i_2 q_2 \overline{i_1} \overline{q_1}$ or $i_2 q_2 \overline{i_1} q_1$ |
| 3 | $i_2 q_2 i_1 q_1$ or $i_2 q_2 i_1 q_1$ |
| 4 | $i_1 q_1 \overline{i_2} q_2$ or $\overline{i_1} \overline{q_1} i_2 \overline{q_2}$ |

Generally at least 2 different mappings should be employed for N>1 diversity branches, where the order and the selection of the mappings is irrelevant, as long as the bit-reliability averaging process, meaning the (reduction of differences in reliabilities) is maintained.

Preferred realizations in terms of number of employed mappings

M-QAM
  Employing $\log_2(M)$ different mappings
  Employing $\log_2(M)/2$ different mappings
M-PSK
  Employing $\log_2(M)$ different mappings
  Employing $\log_2(M)/2$ different mappings
  Employing $2 \log_2(M)$ different mappings The applied signal constellation mappings for modulation at the transmitter and demodulation at the receiver need to match for each individual transmit diversity branch. This can be achieved by appropriate signalling of parameters indicating the proper mapping or combination of mappings to be applied for the diversity branches. Alternatively the definition of the mappings to be applied for transmit diversity branches may be system predefined.

FIG. 4 shows an exemplary embodiment of a communication system according to the present invention. More specifically, the communication system comprises a transmitter 10 and a receiver 20 which communicate through a communication channel consisting of a plurality of diversity branches 40A, 40B and 40C. Although three diversity branches are illustrated in the figure, it becomes clear to a person skilled in the art that an arbitrary number of branches may be chosen. From a data source 11, data packets are supplied to a FEC encoder 12, preferably a FEC Turbo encoder, where redundancy bits are added to correct errors. The bits output from the FEC encoder are subsequently supplied to a mapping unit 13 acting as a modulator to output symbols formed according to the applied modulation scheme stored as a constellation pattern in a table 15. Subsequently the data symbols are applied to a transmission unit 30 for transmission over the branches 40A-C. The receiver 20 receives the data packets by the receiving unit 35. The bits are then input into a demapping unit 21 which acts as a demodulator using the same signal constellation pattern stored in the table 15 which was used during the modulation of that symbol.

The demodulated data packets received over one diversity branch are stored in a temporary buffer 22 for subsequent combining in a combining unit 23 with the data packets received over at least one other diversity branch.

As illustrated in FIG. 5, table 15 stores a plurality of signal constellation patterns #0 . . . #n which are selected for the individual transmissions over the individual diversity branches according to a predetermined scheme. The scheme, i.e. the sequence of signal constellation patterns used for modulating/demodulating are either pre-stored in the transmitter and the receiver or are signalled by transmitter to the receiver prior to usage.

The invention claimed is:

1. A method of transmitting data in a wireless communication system, the method comprising:
   modulating and mapping data using a first signal constellation pattern of a 16-QAM modulation scheme to obtain a first data symbol;
   modulating and mapping said data using a second signal constellation pattern of the 16-QAM modulation scheme which is different from the first signal constellation pattern to obtain a second data symbol; and
   transmitting the first data symbol and the second data symbol to a receiver respectively over a first diversity branch and a second diversity branch.

2. The method according to claim 1, wherein each of the first data symbol and the second data symbol is obtained by mapping more than two data bits into one data symbol.

3. The method according to claim 1, wherein each of the first data symbol and the second data symbol is obtained by mapping four data bits into one data symbol using the 16-QAM modulation scheme.

4. The method according to claim 1, wherein the first and second signal constellation patterns are obtained by:
   (a) interleaving positions of bits mapped into one data symbol between the first and second signal constellation patterns, or
   (b) inverting bit values of the bits mapped into one data symbol between the first and second signal constellation patterns.

5. The method according to claim 2, wherein the first and second signal constellation patterns are obtained by:
   (a) interleaving positions of the bits mapped into one data symbol between the first and second signal constellation patterns, or
   (b) inverting bit values of the bits mapped into one data symbol between the first and second signal constellation patterns.

6. The method according to claim 3, wherein the first and second signal constellation patterns are obtained by:
   (a) interleaving positions of the bits mapped into one data symbol between the first and second signal constellation patterns, or
   (b) inverting bit values of the bits mapped into one data symbol between the first and second signal constellation patterns.

7. The method according to claim 1, wherein the first and second signal constellation patterns are selected such that after diversity combining data bits, differences in bit reliabilities among different bit arrangements of one data symbol are reduced.

8. The method according to claim 4, wherein the first and second signal constellation patterns are selected such that after diversity combining the data bits, differences in bit reliabilities among different bit arrangements of one data symbol are reduced.

9. A transmitter for transmitting data in a wireless communication system, the transmitter comprising:
   a first modulation and mapping section that modulates and maps data using a first signal constellation pattern of a 16-QAM modulation scheme to obtain a first data symbol;
   a second modulation and mapping section that modulates and maps said data using a second signal constellation pattern of the 16-QAM modulation scheme which is different from the first signal constellation pattern to obtain a second data symbol, and
   a transmission section that transmits the first data symbol and the second data symbol to a receiver respectively over a first diversity branch and a second diversity branch.

10. The transmitter according to claim 9, wherein the first and second modulation and mapping sections respectively obtain the first data symbol and the second data symbol by mapping more than two data bits into one data symbol.

11. The transmitter according to claim 9, wherein the first and second modulation and mapping sections respectively obtain the first data symbol and the second data symbol by mapping four data bits into one data symbol using the 16-QAM modulation scheme.

12. The transmitter according to claim 9, wherein the first and second signal constellation patterns are obtained by one of:
   (a) interleaving positions of bits mapped into one data symbol between the first and second signal constellation patterns, and
   (b) inverting bit values of the hits mapped into one data symbol between the first and second signal constellation patterns.

13. The transmitter according to claim 10, wherein the first and second signal constellation patterns are obtained by one of:
  (a) interleaving positions of the bits mapped into one data symbol between the first and second signal constellation patterns, and
  (b) inverting bit values of the bits mapped into one data symbol between the first and second signal constellation patterns.

14. The transmitter according to claim 11, wherein the first and second signal constellation patterns are obtained by one of:
  (a) interleaving positions of the bits mapped into one data symbol between the first and second signal constellation patterns, and
  (b) inverting bit values of the bits mapped into one data symbol between the first and second signal constellation patterns.

15. The transmitter according to claim 9, wherein the first and second signal constellation patterns are selected such that after diversity combining data bits, differences in bit reliabilities among different bit arrangements of one data symbol are reduced.

16. The transmitter according to claim 12, wherein the first and second signal constellation patterns are selected such that after diversity combining the data bits, differences in bit reliabilities among different bit arrangements of one data symbol are reduced.

* * * * *